(12) United States Patent
Krishnan et al.

(10) Patent No.: US 11,848,027 B2
(45) Date of Patent: Dec. 19, 2023

(54) FEDERATED LEARNING WITH SOUND TO DETECT ANOMALIES IN THE INDUSTRIAL EQUIPMENT

(71) Applicant: SAP SE, Walldorf (DE)

(72) Inventors: Kavitha Krishnan, Bangalore (IN); Nicholas John Nicoloudis, Melbourne (AU); Luxi Li, Yokohama (JP); Pai-Hung Chen, Irvine, CA (US); Anton Kroger, Perth (AU)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 17/306,004

(22) Filed: May 3, 2021

(65) Prior Publication Data

US 2022/0351744 A1     Nov. 3, 2022

(51) Int. Cl.
| | |
|---|---|
| *G10L 25/30* | (2013.01) |
| *G06N 3/04* | (2023.01) |
| *G06N 3/08* | (2023.01) |
| *G10L 19/02* | (2013.01) |
| *G10L 25/87* | (2013.01) |

(52) U.S. Cl.
CPC .............. *G10L 25/30* (2013.01); *G06N 3/04* (2013.01); *G06N 3/08* (2013.01); *G10L 19/0212* (2013.01); *G10L 25/87* (2013.01)

(58) Field of Classification Search
CPC ..... G10L 25/30; G10L 19/0212; G10L 25/87; G06N 3/04; G06N 3/08; G06N 3/045
See application file for complete search history.

(56) References Cited

U.S. PATENT DOCUMENTS

| | | | |
|---|---|---|---|
| 2017/0279838 A1* | 9/2017 | Dasgupta | H04L 63/1425 |
| 2019/0121897 A1* | 4/2019 | Edalur | G06F 16/244 |
| 2019/0261109 A1* | 8/2019 | Das | G05B 23/0216 |
| 2020/0160227 A1* | 5/2020 | Liu | G06N 20/00 |
| 2021/0144047 A1* | 5/2021 | Erickson | H04L 41/22 |

(Continued)

OTHER PUBLICATIONS

Qin, Y., & Kondo, M. (Mar. 2021). Mlmg: Multi-local and multi-global model aggregation for federated learning. In 2021 IEEE International Conference on Pervasive Computing and Communications Workshops and other Affiliated Events (PerCom Workshops) (pp. 565-571). IEEE. (Year: 2021).*

(Continued)

*Primary Examiner* — Bhavesh M Mehta
*Assistant Examiner* — Philip H Lam
(74) *Attorney, Agent, or Firm* — Mintz Levin Cohn Ferris Glovsky and Popeo, P.C.

(57) ABSTRACT

In some example embodiments, there may be provided a method that includes receiving a machine learning model provided by a central server configured to provide federated learning; receiving first audio data obtained from at least one audio sensor monitoring at least one machine located at the first edge node; training, based on the first audio data, the machine learning model; providing parameter information to the central server in order to enable the federated learning among a plurality of edge nodes; receiving an aggregate machine learning model provided by the central server; detecting an anomalous state of the at least one machine. Related systems, methods, and articles of manufacture are also described.

18 Claims, 9 Drawing Sheets

(56) References Cited

U.S. PATENT DOCUMENTS

2021/0256991 A1* 8/2021 Jun .................. G10L 25/18
2022/0108177 A1* 4/2022 Samek ............... G06N 3/045

OTHER PUBLICATIONS

Pang, G. et al., "Deep Anomaly Detection with deviation Networks," arXiv:1911.08623v1, Nov. 19, 2019, (10 Pages). https://arxiv.org/abs/1911.08623.

Purohit, H. et al., "MIMII Dataset: Sound Dataset for Malfunctioning Industrial Machine Invenstigating and Inspection," arXiv:1909.09347v1, Sep. 20, 2019, (5 Pages). https://arxiv.org/abs/1909.09347.

Taik, A. et al., "Federated Edge Learning: Design Issues and Challenges," arXiv:2009.00081v1, Aug. 31, 2020, (8 pages). https://arxiv.org/pdf/2009.00081v1.pdf.

Talmoudi, S. et al., "IoT-based Machinery Failure Predictive Solution using Big Data Analysis on the MIMII Dataset," Research Square, (17 pages). https://assets.researchsquare.com/files/rs-48418/v1_stamped.pdf.

Koizumi, Y. et al., "ToyADMOS: A Dataset of Miniature-Machine Operating Sounds for Anomalous sound Detection," 2019 IEEE Workshop on Applications of Signal Processing to Audio and Acoustics, Oct. 20, 2019, pp. 313-317.

M, Parimala et al., "Fusion of Federated Learning and Industrial Internet of Things: A Survey," arXiv:2101.00798v1, Jan. 4, 2021, Cornell University Library, 24 pages.

Nguyen, D.C. et al., "Federated Learning for Internet of Things: A Comprehensive Study," IEEE Communications Surveys & Turtorials, vol. 23, No. 3, Apr. 23, 2021, pp. 1622-1658.

Qin, Y. et al., "MLMG: Multi-Local and Muli-Global Model Aggregation for Federated Learning," SmartEdge 2021: The Fifth IEEE International Workshop on Smart & Green Edge Computing and Networking, Mar. 22, 2021, pp. 565-571.

Sater, R.A. et al., "A Federated Learning Approach to Anomaly Detection in Smart Buildings," ACM Transactions on Internet of Things, vol. 2, No. 4, Oct. 20, 2020, pp. 1-23.

Extended European Search Report issued in European Application No. 21211215.5-1203, dated May 27, 2022, 10 pages.

\* cited by examiner

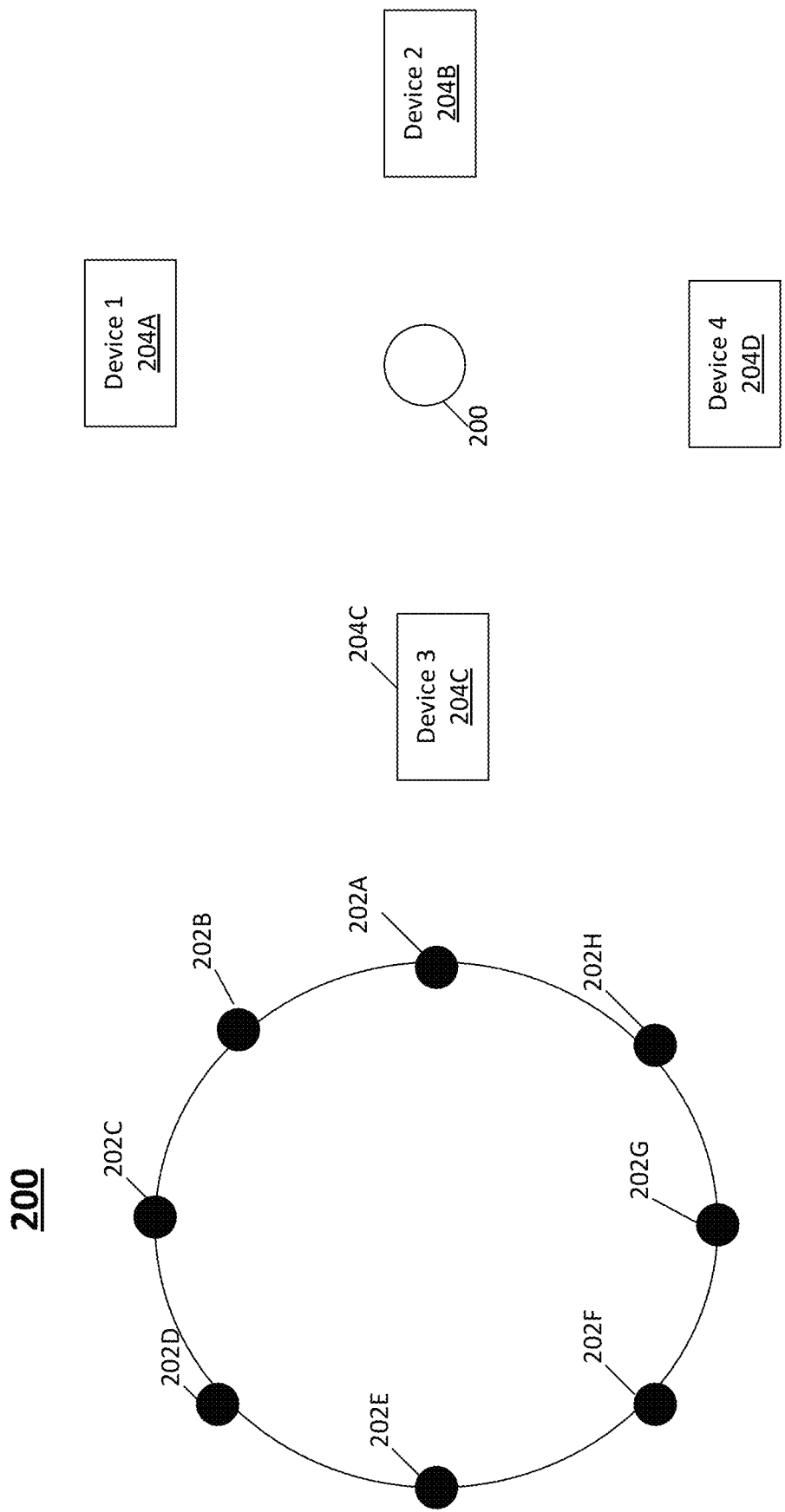

FEDERATED LEARNING WITH SOUND TO DETECT ANOMALIES IN THE INDUSTRIAL EQUIPMENT

TECHNICAL FIELD

This disclosure relates generally to machine learning and IoT devices.

BACKGROUND

Many organizations may rely on enterprise software applications including, for example, enterprise resource planning (ERP) software, customer relationship management (CRM) software, and/or the like. These enterprise software applications may provide a variety of functionalities including, for example, factory operations and maintenance, invoicing, procurement, payroll, time and attendance management, recruiting and onboarding, learning and development, performance and compensation, workforce planning, equipment tracking, and/or the like. Some enterprise software applications may be hosted by a cloud-computing platform such that the functionalities provided by the enterprise software applications may be accessed remotely by multiple end users at computing devices. For example, an enterprise software application may be available as a cloud-based service including, for example, a software as a service (SaaS) and/or the like.

SUMMARY

In some example embodiments, there may be provided a method that includes receiving, at a first edge node, a machine learning model provided by a central server configured to provide federated learning among a plurality of edge nodes including the first edge node; receiving, at the first edge node, first audio data obtained from at least one audio sensor monitoring at least one machine located at the first edge node; training, at the first edge node, the machine learning model, the training based on the first audio data; in response to the training, providing, by the first edge node, parameter information to the central server in order to enable the federated learning among the plurality of edge nodes including the first edge node; in response to the federated learning, receiving, by the first edge node, an aggregate machine learning model provided by the central server; detecting, by the first edge node including the aggregate machine learning model, an anomalous state of the at least one machine, the anomalous state detected based on a second audio data received from the at least one audio sensor; and reporting, by the first edge node, the anomalous state to the central server.

In some variations, one or more of the features disclosed herein including the following features can optionally be included in any feasible combination. The parameter information may include configuration information about the machine learning model trained by the first edge node. The configuration information may include one or more weights for the trained machine learning model. The first audio data may be pre-processed by at least filtering, based on time of arrival, the first audio data to remove, at least partially, other audio data associated with other machines. The first audio data may be pre-processed by at least transforming the first audio data into the frequency domain. The machine learning model may include at least one of a convolutional neural network or a generative adversarial network. The aggregate machine learning model may include an average of the parameter information provided by the first edge node and of other parameter information provided by other edge nodes of the plurality of edge nodes. The aggregate machine learning model may be generated without the central server accessing the first audio data at the first edge node or other audio data at the other edge nodes. The training may further include providing, as an input to the machine learning model, the first audio data including time stamp information and label information indicative of whether an anomaly is present. The first audio data may correspond to training data to train the machine learning model. The second audio data may represent operational data without label information indicative of whether the anomaly is present.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 2A-2C depict examples of sensors, such as acoustic sensors, in accordance with some implementations of the current subject matter;

DETAILED DESCRIPTION

Figure 1A:
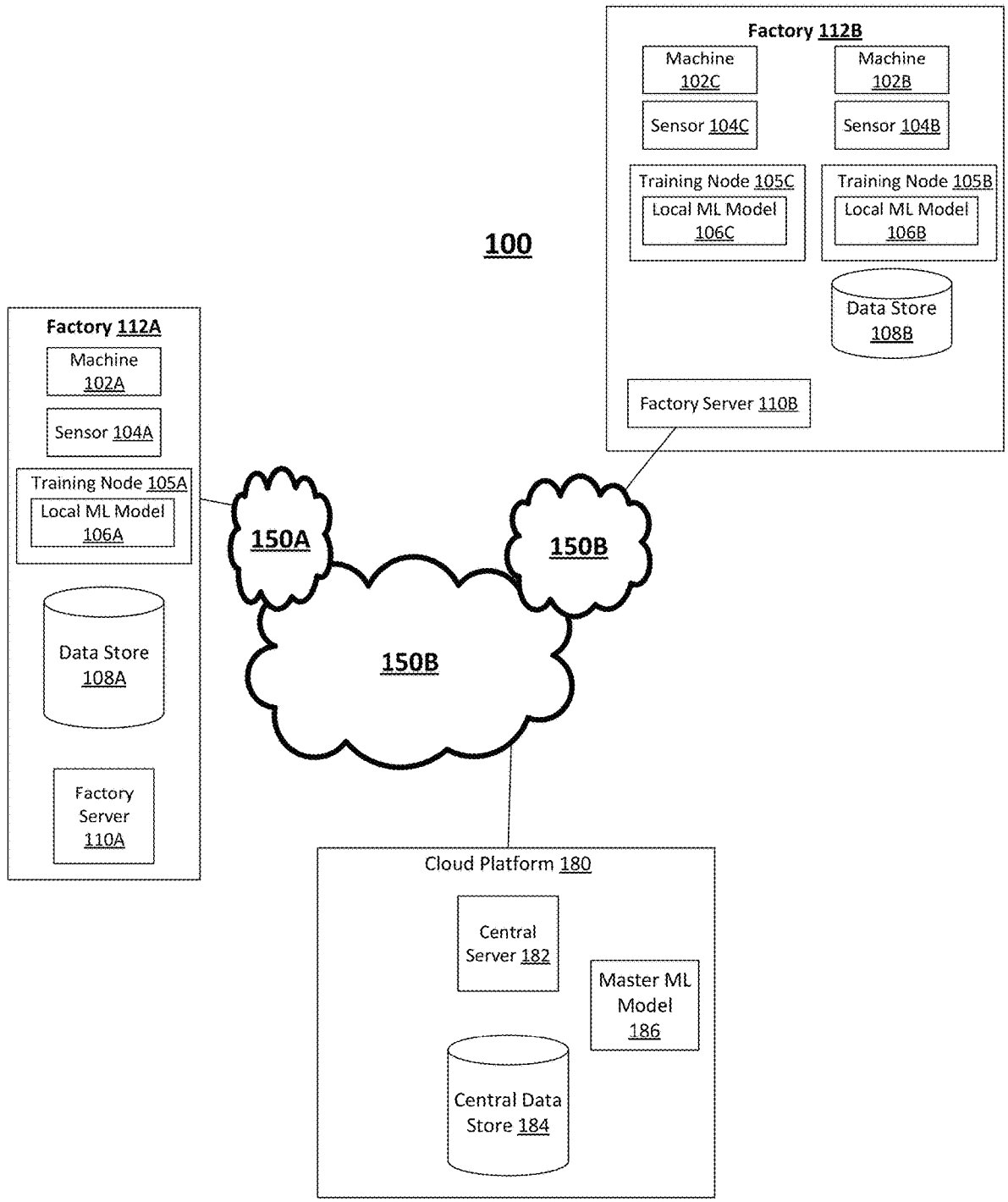
FIGS. 1A-1B illustrates examples of systems, in accordance with some implementations of the current subject matter.

Factories and other types of facilities and industries, such as mining, oil and gas, and the like, may include machinery, such as pumps, motors, fans, valve, slide rail, actuators, and/or other types of machines. From time to time, these machines may require maintenance in the form of replacements, adjustments, and the like. If maintenance is performed too often (such as before maintenance is really needed), the maintenance results in unnecessary downtime. But if the maintenance is not performed frequently enough, there is an increasingly likelihood of an unexpected failure of the machine, which results in an unexpected downtime.

Machine learning may be used to learn when to provide maintenance to the machine. For example, a machine learning (ML) model may learn to determine when maintenance should be performed on a machine (e.g., predicting a failure has occurred or predicting a failure is about to occur). In some instances, sensors may be used to monitor a machine and provide sensor data to the ML model, so that the ML model learns to predict when a machine needs maintenance to avoid, for example, a failure. When the ML model is trained, the ML model may detect anomalies indicative of the machine needing maintenance.

In the case of machine learning based solutions however, the sensor data from one or more of the machines being monitored may result in an enormous volume of data and may (if a remote, cloud platform is used to host the ML model) require ultra-reliable, low-latency communications to couple to the remote, cloud platform. And due to the propriety and/or private nature of the sensor data being collected from the machines, end-users may be hesitant to share the raw sensor data with a remote cloud server or share the sensor data with other end-users having the same or similar types of machines. As such, the ML model may be hosted at the "edge" of the network, where, for example, a factory or the machines being monitored are located. Using only sensor data locally available at the factory or machine may, however, provide a machine learning model that is trained with a scarce data set and thus not as robustly trained, when compared to a machine learning model that benefits from a larger, more robust, larger training dataset from a plurality of end-user locations.

In some example embodiments, there is provided a federated learning model that uses a central server that maintains a master machine learning model and provides a copy of that master machine learning model to each of the edge nodes, such as the factories where the machines are located as noted in the previous example. At each of the edge nodes, the copy of the master machine learning model is used locally as a local machine learning model. At a given edge node for example, the sensor data (which is obtained locally from at least one sensor monitoring a machine) is used to locally train the local machine learning model. Next, each of the edge nodes may provide to the central server feedback, such as the local machine learning model's parameters (e.g., weights, gradients, and/or other parameters for the local machine model's configuration), but the edge nodes do not share the local sensor data. The central server may then aggregate the parameter information received from the edge nodes to update the master machine learning model. The parameter information refers to the parameters defining the configuration of the ML model, such as the weights of a neural network. This updated master machine learning model (also referred to herein as an aggregate learning model) may again be copied and shared with the edges nodes (to repeat the noted process). In federated learning, the central sever may pool the learning occurring at each of the machine learning models at the edge nodes, without the central server having access to the local sensor data at a given edge node.

FIG. 1A depicts an example of a system 100, in accordance with some example embodiments. The system 100 may include a central server 182, which may be implemented in a cloud platform 180. The central server may be configured to control the federated learning process at each of the edge nodes, which in this example are located at a factory 112A and a factory 112B (although other types of locations may host the edge nodes as well).

The central server 182 may be coupled to a central data store 184. In some embodiments, the central server may provide to each of the edge nodes a copy of the master ML model 186, which serves as local ML models 106A-C at each of the edge nodes. These local ML models may be one or more of the following: a preconfigured default ML model (e.g., an ML model that has been at least partially trained); an initialized local ML model (e.g., an ML model which has not been trained so the ML model may have random or initialized settings as parameters); or an updated copy of the master ML model.

As the local edge nodes at factory 112A and 112B train their local ML models 106A-C, the central server 182 may also receive, from each edge nodes, parameter information, such as ML model parameter information or neural network parameter information (e.g., the weights, gradients, and/or other information regarding the local ML model, or neural network, being trained). As noted, the edge nodes share the parameter information describing the configuration of the local ML model, but the edge nodes do not share local sensor data with the central server. The central server may process (e.g., aggregate, combine, average, etc.) the parameter information received from the edges nodes. The central server may use the processed parameter information to update the master ML model 186. The central server may then repeat the process by providing (e.g., publish, send, etc.) to each of the edge nodes the updated ML master model 186, which again serves as a local ML model 106A-B at each of the edge nodes. This process may repeat until the ML models converge (or reach a threshold accuracy for determining when to maintain a given machine). In short, the central server is responsible for aggregating the parameter information from each of the edge nodes in order to generate the master ML model (which takes into account the training or learning occurring across the edge nodes). And, the master ML model is trained with the central server having the sensor data output generated by the sensors at the edge nodes.

The central data store 184 may store one or more master ML models (as well as other ML models for different types of machines), parameter information, and/or other metadata.

In some embodiments, the central data store may store a ML model for a specific type of machine. For example, the central data store may store a plurality of different ML models for different types of machines. When this is the case, the ML model may be selected by the central server 182 based on the machine being monitored at an edge node. For example, a first machine learning model may be selected for a fan (or a specific type or a model of fan) being monitored as machine 102A, a second machine learning model may be selected for a pump (or a specific type or a model of pump) being monitored as machine 102B, and a third local machine learning model may be selected for another pump, and so forth.

The cloud platform 180 may be implemented as a public cloud platform (e.g., Amazon Web Services, Azure, etc.) and/or via a private cloud (e.g., a cloud platform operated solely for a single organization). The cloud platform may be coupled via a network 150B (e.g., the Internet and/or any other type of communication media) to a first factory 112A and a second factory 112B. In the example of FIG. 1A, edge networks 150A and 150B are depicted. The edge networks may correspond to an access network, such as a wireless local area network (WLAN), a WiFi network, a 5G local private cellular network, and/or other types of networks (including ultra-reliable, low-latency edge networks). In this example, the edge nodes at the factory are thus coupled to the edge network. Although FIG. 1A depicts a cloud platform 180, other types of processor platforms may be used as well.

In the example of FIG. 1A, the first factory 112A may include one or more machines, such as machine 102A. The machine 102A may correspond to any type of machine, such as a pump, an actuator, a drill, a fan, a generator, and/or any other type of machine that can be monitored by a sensor.

The machine 102A may be monitored by one or more sensors, such as sensor 104A. For example, the sensor 104A may include a sensor that measures, derives, and/or collects data on the machine, and this sensor data may be used by the local ML model 106A (e.g., to train (during a training phase) and/or predict (in an operational phase) when maintenance should be performed on the machine 102A being monitored by sensor 104A). The sensor 104A may comprise a sound sensor (e.g., such as an acoustic sensor, microphone, and/or the like), a temperature sensor, a pressure sensor, a transducer, and/or any other type of sensor. The sensor may be a wired sensor coupled to a computing device, such as training node 105A hosting the local machine learning model 106A. Alternatively, or additionally, the sensor may be a wireless sensor (e.g., an IoT sensor) wirelessly coupled to the computing device.

In some embodiments, the training node 105A may receive sensor data, such as sound data, from sensor 104A, persist the sensor data to the data store 108A, train the local machine learning model 106A with sensor data, predict anomalies with the local ML model 106A, and communicate with the factory server 110A (e.g., providing parameter information, query regarding the availability of updated ML models, anomaly detection information, and/or the like). In some embodiments, the training node 105A hosts at least the machine learning model 106A. The training node 105A may also track whether there is sensor data (e.g., audio sensor data from sensor 104A available to train the local ML model 106A or generate an anomaly score indicative of an anomaly at the machine 102A). The training node may also track (e.g., query or receive a notification regarding) the availability of an updated machine learning model at the central server.

In some embodiments, the sensor 104A comprises an audio sensor, such as a microphone, that captures sound from one or more machines at a location, such as the factory 112A. Moreover, the sensor 104A may comprise a plurality of audio sensors, such as an acoustic array. In a location such as a factory with many different sources of sound, the acoustic array may enable sound localization of the source location of received sounds, such that the direction and distance from the sensor to the source location of the sound can be determined. For example, the acoustic array may localize sounds originating from the location of the machine 102A. This localization may allow the sounds from machine 102A to be processed while the sounds (or sensor data) coming from other locations in the factory are filtered out or ignored. The sound localization may be performed using time division of arrival (TDOA). TDOA can be used to filter sounds as well as triangulate the location of the source of the sound, although other techniques may be used as well.

The factory server 110A may be configured to receive sensor data from the sensor 104A, coordinate with the training node 105A the local training of the local ML model 106A, and/or communicate with the central server 182 (e.g., receive ML models, provide parameter information for the ML model, receive updated ML models, etc.). The factory server may send to the central server parameter information (e.g., weights, etc.) for the local ML model, and/or query the central server for updated ML models. Moreover, the factory server may receive anomaly scores and/or anomaly alerts and may forward the anomaly scores and/or alerts to other computing devices, so that the anomaly scores/alerts can be presented at a user interface to indicate an anomaly at a given machine (e.g., a need for maintenance). For example, the local ML model 106A (when trained and/or during training) may issue an anomaly alert indicating (based on the sensor data from sensor 104A) machine 102A may require maintenance. This alert may be presented at a user interface of computing device coupled to factory server 110A or cloud platform 180. This alert may also serve as a label for the sensor data, such that the sensor data associated with the time the anomaly alert can be used to further train the local ML model 106A. In some instances, the user interface presenting the anomaly alert may request a confirmation that the anomaly alert is indeed accurate or that the anomaly alert is false (e.g., a user at the user interfaces selects a user interface element to confirm or reject the anomaly alert for the machine). This confirmation may also be provided with a label to further train the local ML model. Although training node 105A and factory server 110A are depicted as separate devices, the training node 105A may be implemented as part of the factory server 110A.

The data store 108A may be used to store sensor data (which may include sound data collected by sensor 104A), the local ML models, and other metadata.

In some embodiments, the factory 112A may include a plurality of machines 102A and the like being monitored. When this is the case, each machine, such as machine 102A, may have one or more sensors 104A, such as sound sensors and/or other types of sensors. These sound sensors, such as a microphone, may receive and record sound (or acoustic sensor data) for each machine. Moreover, each machine may be assigned to a machine learning model, which trains to determine when the machine should be maintained based on the sensor data, such as the sound sensor data, received by the machine learning model.

FIG. 1A also depicts the factory 112B, which may also include the machines 102B-C being monitored by the sensors 104B-C to enable training the corresponding ML models 106B-C at the training nodes 105B-C. The data store 108B and the factory server 110B may operate in the same or similar manner as described above with respect to the data store 108A and the factory server 110A.

Figure 1B:
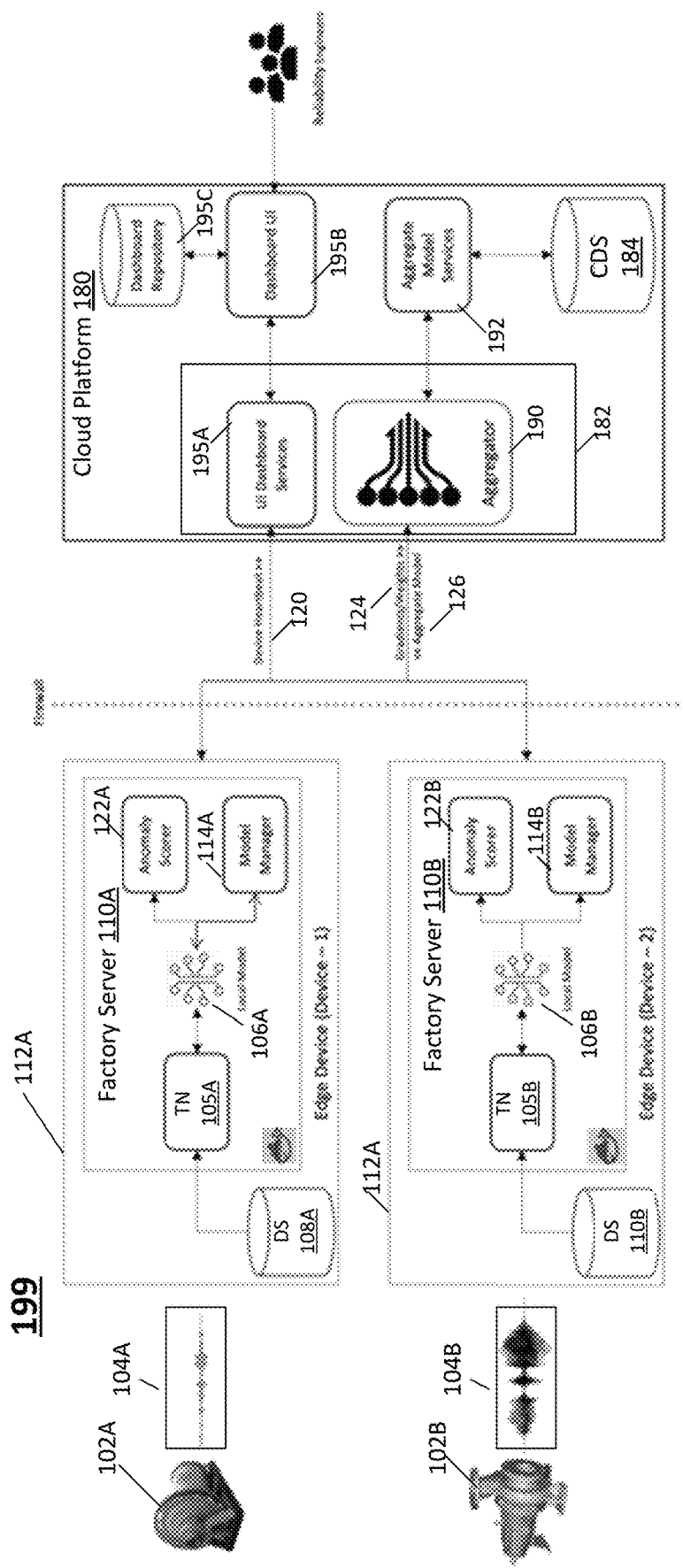

FIG. 1B depicts a system 199, in accordance with some example embodiments. The system 199 is similar to system 100 in some respects but shows some additional features. For example, FIG. 1B depicts scorers (labeled "anomaly scorer") 122A-B, model managers 114A-B, aggregator 190, dashboard services 195A, dashboard UI 195B, dashboard repository 195C, and model services 192.

The scorer 122A-B (labeled anomaly scorer) each calculate an anomaly score. For example, the machine learning model 106A may be trained based on sensor data. This sensor data may be collected by the sensor 104A and then stored with a time stamp at the local data store 108A. During training, the sensor data may include one or more labels, such as a label that indicates an anomaly (e.g., a machine failure or other machine issue that may represent a failure or a precursor to a failure) and a time (e.g., time stamp) when the anomaly occurred. The labeled time stamp data may then serve as reference data to train the local ML model 106A.

For example, the scorer 122A may also be notified when new sensor data is available (e.g., for training or to detect anomaly). The scorer may also be notified when updated ML models at the central server. The scorer may also score the sensor data (e.g., audio data) using a local ML model and an aggregate ML model. The scorer may send a heartbeat message (e.g., indicative of an anomaly score of a machine) to the central server 182 or other device to enable processing of the heartbeat message (e.g., generating an alert for a user interface).

The factory server 110A may include an audio retriever providing a representation state transfer (REST) endpoint for receiving requests for audio sensor data (or other types of sensor data). The request may be received from a user interface or other device. The audio retrieval may, in response to the request, retrieve the sensor data (e.g., audio segments) from the data store 108A and respond to the request with the sensor data, such as the audio data. The factory server 110A may include an audio feeder configured to notify other components of system 199 (or 100), such as the scorer, trainer, and/or the like, of the existence of a new sensor data (e.g., audio segments) available for processing.

In the example of FIG. 1B, the factory server 110A includes the model manager 114A. The model manager may be notified of a new local machine learning model available at a training node; send 124 parameter information (e.g., connection weights) of the new local machine learning model to model aggregator 190; receive 126 a new aggregate machine learning model from the model aggregator; notify scorer of the new local machine learning model and/or aggregate machine learning model for scoring; and/or notify the training node of local machine learning model to train off.

When trained, the local machine learning model 106A may receive as an input sensor data from sensor 104A and output an indication of whether an anomaly is present. The scorer 122A may forward the anomaly indication (which is obtained from the local machine learning model) in a message 120. This message 120 may be in the form of a heartbeat message 120 indicating the identity of the machine (e.g., identity of machine 102A), a time stamp (e.g., date and/or time), and/or the indication of anomaly (e.g., which may indicate anomaly type). For example, the local machine learning model 106A may receive sound data (collected by sensor 104A) and output an indication that machine 102A has a fan blade that needs maintenance immediately or within the next 24 hours. The scorer 122A may forward the indication in the heartbeat message 120 to central server 182 and, in particular, a user interface service 195A that generates an alert for presentation on a user interface 195B (labeled Dashboard UI) being viewed by end-users 197 assigned to (or responsible for) machine 102A. The dashboard repository 195C provides a repository of user interface elements for used by the user interface 195B.

In some embodiments, the heartbeat message 120 sent to the aggregator 190 includes one or more of the following: an anomaly score from a local ML model; an anomaly score from an aggregate ML model; identification of the version of the local ML model and/or aggregate ML model; sensor data identifier associated with the anomaly (e.g., the identifier can be used to search fort eh sensor data at the data store 108A); and a time stamp. In some embodiments, the machine learning model generates and provides as an output the anomaly score. The machine learning model generates (based on the sensor data provided as an input to the machine learning model, the anomaly score. This anomaly score represents a likelihood, probability, or other indication regarding whether the machine is in an anomalous (e.g., a failure or a pre-failure) state.

In the example of FIG. 1B, the machine 102A is being monitored by a sensor, such as sensor 104A, configured to monitor at least sound. For example, the sensor 104A may generate a signal representative of the sound being emitted by machine 102A. This sensor data (which in this example is sound sensor data or, more simply, sound data) may be provided to training node 105A. The training node may process the sound data from sensor 104A and machine 102A to train the local machine learning model 106A. This training may be continuous or occur from time to time. The outcome of this process would create/update the local models in the edge container.

In the example of FIG. 1B, the model manager 192 (labeled "aggregate model services") stores ML models, tracks updates to the ML models, provides update ML models to edge nodes, and stores ML models in the central data store 184.

In the example of FIG. 1B, system 199 includes the aggregator 190. The aggregator may provide aggregation of the parameter information provided by the edge nodes. For example, the aggregator may receive (as shown at 124) the parameter information from the edge nodes (e.g., model manager 114A) where one or more local machine learning models monitor one or more certain machines. As noted, each of the local machine learning models may be assigned to monitor a specific type of machine (e.g., a pump, a certain type of pump, or a certain model of pump). When the parameter information from the edge nodes is received by the aggregator 190, the aggregator may combine the parameter information. In the case of ML model weights for example, the aggregator may combine the weights by averaging the weights and then adding the averaged weights to update the master ML model 186. This updated master ML model may also be referred to as an aggregate ML model. The aggregator 190 may send the aggregate ML model to the model manager 192, centralized data store 184, and/or edge nodes (as shown at 126). The aggregator 190 may also provide metadata (e.g., version information for the aggregate model, etc.) of the aggregate ML model to the US dashboard services 195A.

The aggregator 190 may also notify the edge nodes when the master model is updated (by the aggregate model services) to include updated or aggregated weights. In other words, when the aggregate model services 192 generates an updated, aggregate model, the parameter information for the updated model is published to the edge nodes as an update, so the edge nodes can update their local ML models.

The system 199 may include, as noted, user interface service (labeled dashboard services) 195A. The user interface services handles actions and/or alerts that are caused to be displayed on a user interface, such as a dashboard presented on a computing device (where an end-user such as a reliability or maintenance engineer can view the status of a machine). The user interface service 195A may generate alerts, such as a visual, audio, and/or haptic, such that an end-user is alerted that a machine requires maintenance. The alert may be conveyed to the end-user via a user interface.

As noted, the user interface service 195A may provide a user interface, such as a dashboard at 195B. This dashboard may also include an alert regarding the anomaly at the machine 102A, for example. This dashboard may also include the audio associated with the anomaly at the machine 102A. The dashboard may also provide a plot of the state of the machine based on the heartbeat messages. The plot may comprise an X-axis representative of time and a Y-axis representative of an anomaly score. The higher the anomaly score value, the more probability of the machine is having an anomaly.

The dashboard may provide representational state (REST) endpoints for reading equipment master data and configuration settings from a data store, receiving heartbeat messages (e.g., from anomaly scorer), and/or receiving version/metadata for a newly built aggregated machine learning model from the aggregator 190. The dashboard 195A may also serve (e.g., cause to be presented) an end-user user interface (e.g., to present equipment master data, present visualization for trending of anomaly scores for local and aggregate machine learning models from heartbeat messages, retrieve audio segment from edge nodes, and/or present visualizations).

In some embodiments, the sensor 104A may, as noted, collect sound from a machine. This data may be recorded and stored at a data store, such as data store 108A. Moreover, the sound data may be labeled with a time stamp indicating when a failure occurred. For example, a sensor may record the sound from a pump over time. When a failure occurs at a given time, the sound data may be labeled with a time stamp at the given time. This labeled data may be used to train the machine learning model. In some example embodiments, the sensor 104A may comprise a plurality of sensors, such as an array of sound sensors configured to localize the sound.

FIG. 2A depicts an example of an array of microphones 202A-H. The array enables sound localization. For example, the sound recordings may be collected from the microphone array 200 (e.g., microphones 202A-H). In the example of FIG. 2A, the same type of microphone is used and spaced in an equidistant manner from neighboring microphones as shown at FIG. 2A. Although FIG. 2A depicts a certain quantity of microphones, other quantities of microphones may be used as well.

FIG. 2B depicts the distance and direction from the microphone array 200 to 4 different types of machines 204A-D. The microphones 202A-H may record (e.g., either continuously and/or intermittently) the sounds, which are segmented into a given length (e.g., 10 seconds) in a noisy, factory environment (so each segment includes eight separate channels for each segment).

Figure 2C:
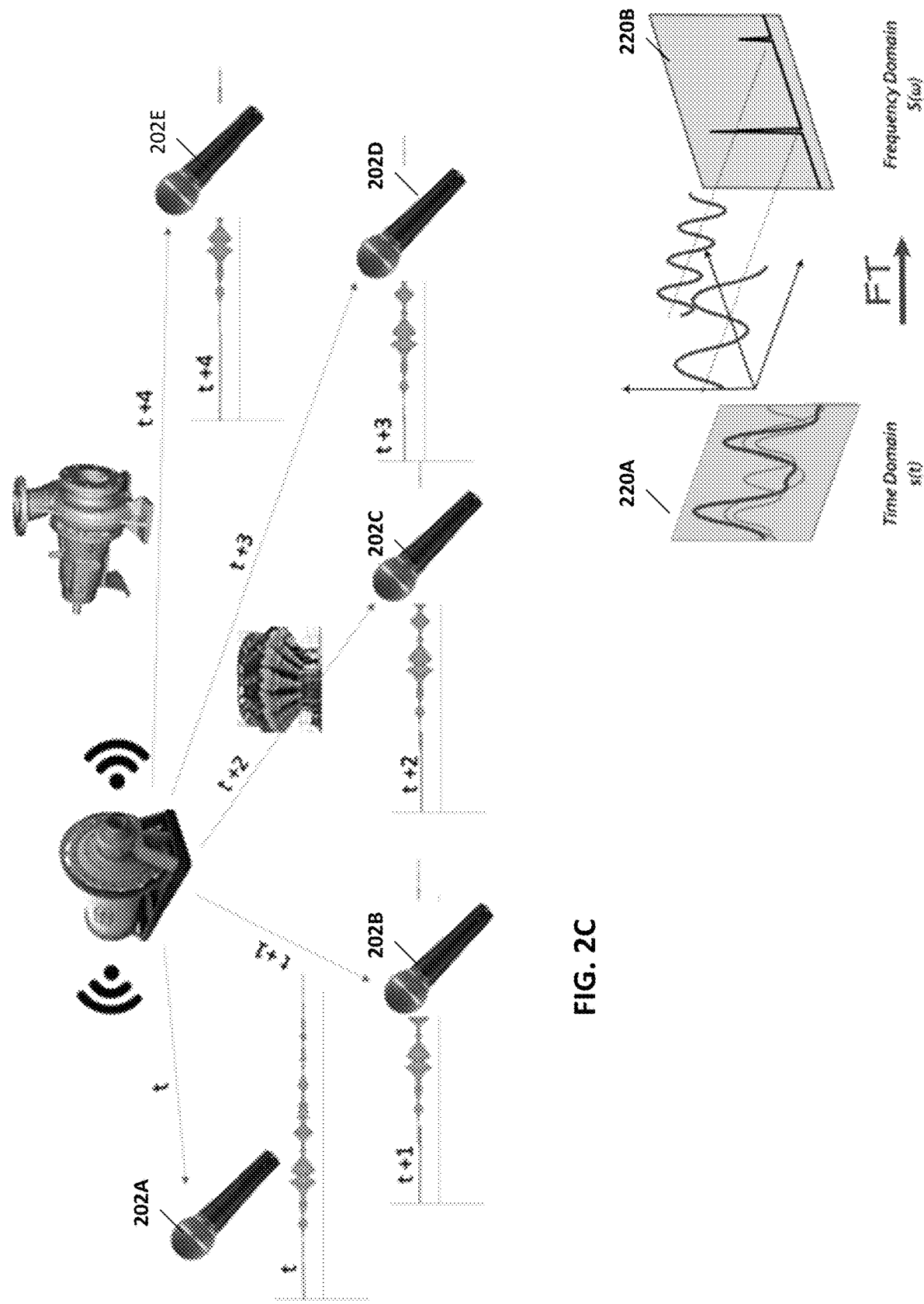

FIG. 2C depicts some of the microphones 220A-E of the array 200 to illustrate the sound localization provided by a plurality of microphones. The time difference of arrival (TDOA) from each of the microphones may be used to determine direction to the source of the sound and distance to the source of the sound.

The sound collected from the one or more sensors (e.g., microphones 220A-H) may be stored in a digital format including time stamps to enable correlation with machine faults. Moreover, the sound may be processed in other ways as well. For example, a transform, such as a Fourier Transform, may be used to convert the time domain sound signal to a frequency domain signal as shown at 220A-B. When a failure occurs at a given time for example, the frequency and/or time domain sound data may be labeled with the time (e.g., a time stamp) of the fault at a given machine to train the machine learning model.

Figure 3:
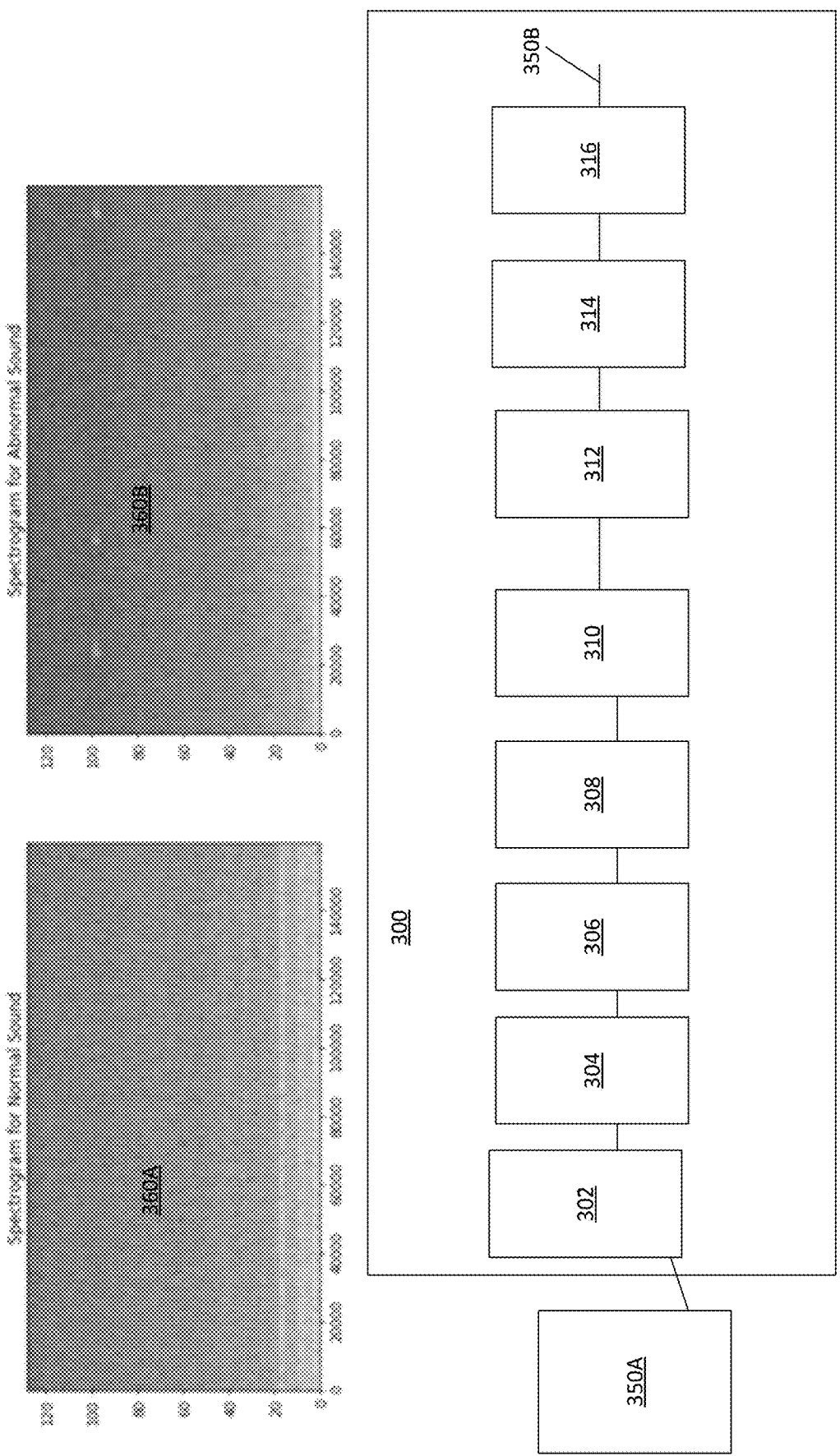
FIG. 3 depicts an example of a machine learning model configured to detect an anomaly and determine when to perform maintenance based on audio sensor data, in accordance with some implementations of the current subject matter.

FIG. 3 depicts an example ML model 300, in accordance with some example embodiments. The ML model 300 comprises a convolutional neural network (CNN), although other types of ML models may be used (e.g., a Generative Adversarial Network). The ML model includes a first max pooling layer 302, followed by a first convolution layer 304, followed by a second max pooling layer 306, followed by a second convolution layer 308, followed by a third max pooling layer 310, followed by a third convolution layer 312, followed by a fourth max pooling layer 314, and a dense layer 316. The ML model's 300 input 350A corresponds to sensor data used as features. The ML model's 300 output 350B corresponds to whether an anomaly is present at the machine.

During a training phase of the ML model 300, the sensor data is provided as an input at 350A, for example. This sensor data may include sensor data associated with a machine that is operating properly and sensor data associated with a machine having an anomaly. Moreover, the sensor data may have time information (e.g., time stamps). In the example of FIG. 3, the sensor data corresponds to time domain sound information captured by the sensor 104A (e.g., a microphone) monitoring the sound from the machine 102A, which in this example is a fan. In the case of the fan for example, there are different types of industrial fans, so the training is performed for a specific subset fans (and/or a specific model of a fan). The sensor 104A collects sound (e.g., audio) data over time, and during that time the machine operates normally (e.g., without anomaly) and operates abnormally (e.g., with anomalies). The sensor data includes examples of audio data of the fan in a normal state and example of audio data in an abnormal. The normal and abnormal sound sensor data is then presented as an input at 350A (along with labels to indicate the abnormal state and/or normal state). For example, 1016 normal audio files and 359 abnormal audio files may be cycled through at the input 350A until the ML model learns (e.g., configures its weights, etc.) to provide the correct output 350B (e.g., classify at the output an audio file as normal when it is normal and classify the output as abnormal when the audio file corresponds to an abnormal state). The output 350B may comprise a value (e.g., a probability or a likelihood for the input data 350A being an anomaly).

In the example of FIG. 3, the audio sensor data is pre-processed before being provided at the input 350A. For example, the audio data may be converted into a frequency domain representation before being provided at the input 350A. To illustrate, the audio file may be windowed and a Fast Fourier Transform performed for each window and the y-axis is converted into the mel scale, so each window corresponds to a frequency spectrum (x-axis) and a mel scale (y-axis). FIG. 3 depicts a first spectrogram 360A for an audio sensor data for a machine operating normally and a second spectrogram 360B for an audio sensor data for a machine operating abnormally. As noted, these spectrograms 360A-B are provided at input 350A until the CNN converges its weights (e.g., internal parameters) to classify correctly the training data provided at the input.

After the ML model is trained, the factory server 110A may forward the parameter information for the ML model to the central server 182. And after the ML model 300 is trained, the ML model 300 may be used as a local ML model to classify the sensor data 104A from machine 102A to detect anomalies. In an example implementation, the CNN 300 may obtain greater than about 98.6% accuracy in detecting anomalies in the sensor data, such as the audio sensor data.

Figure 4:
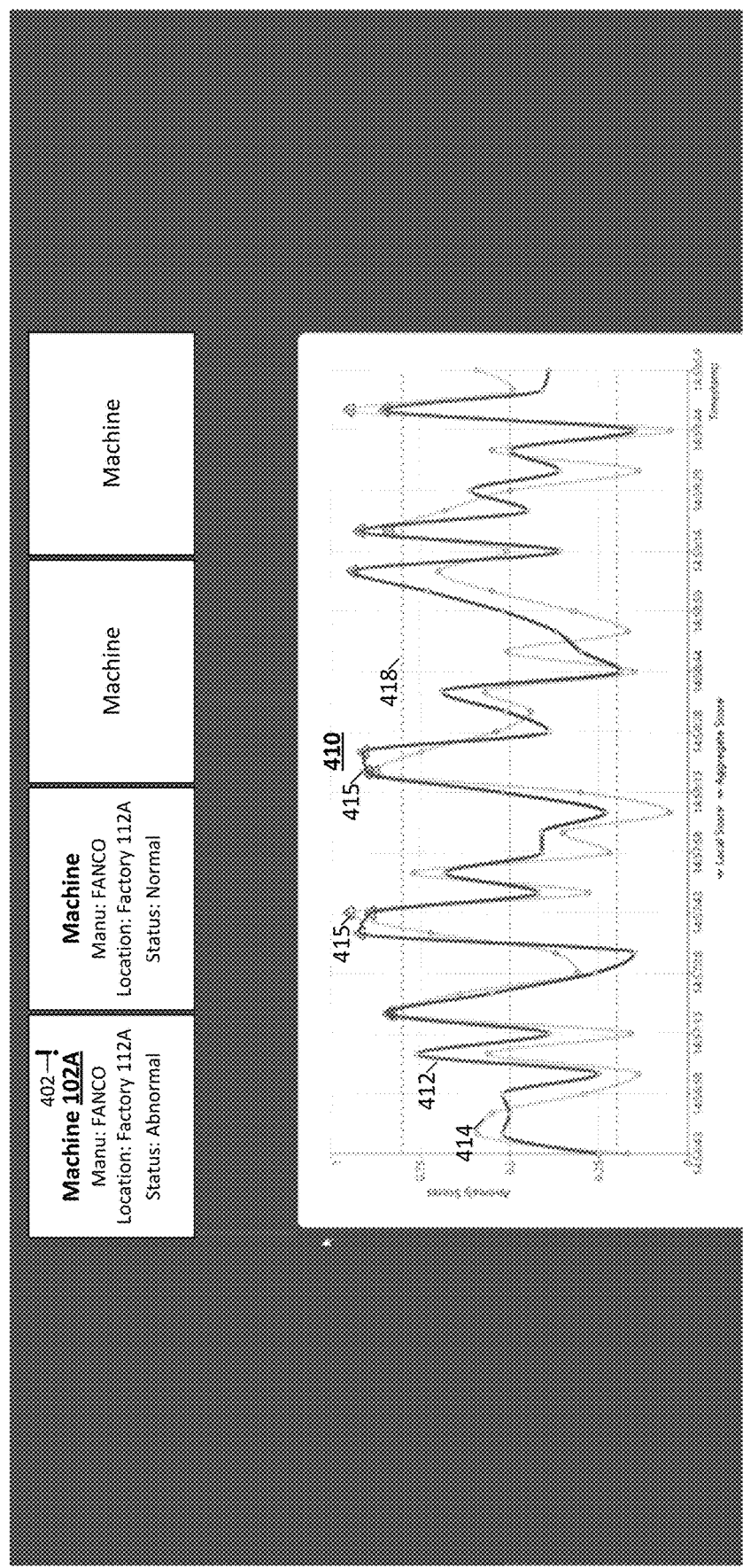
FIG. 4 depicts an example of a user interface, in accordance with some implementations of the current subject matter.

FIG. 4 depicts an example of a user interface 400, in accordance with some example embodiments. The user interface 400 may be presented to an end-user (e.g., an engineer) to evaluate the health of the machine 104A as well as other machines. If an anomaly is detected by the local ML model 106A, an alert 402 (which in this example is "!" although other types of alerts may be generated as well) will be indicated on the user interface.

For example, the edge nodes or devices, such a nodes 112A, may determine an anomaly score. The anomaly score may be provided via the heartbeat message to the central server 182. Based on the anomaly score, the user interface 400 may highlight or indicate whether a machine, such as machine 102A in this example, is in an anomalous state. Moreover, selecting machine 102A via the user interface 400 may provide additional information regarding the machine and/or anomaly. For example, selecting machine 102A at user interface 400 may present an audio-view of the machine 102A. The audio-view 410 presents the anomaly scores for the machine 102A at regular intervals.

In the example of audio-view 410, the local score 414 and aggregate score 412 are plotted. The local score 414 represents the score calculated against a local ML model) which is built based on only locally available sensor data, such as the audio data from sensors 104A. The aggregate score 412 represents the score calculated against the aggregate ML model that is built by the central server in a federated manner based on learning across a plurality of edge nodes. The aggregate ML model performs better than the local ML model over time since the aggregate ML model is built on a larger dataset from a plurality of devices. In this example, the edge node is able to operate using a local machine learning model (which is trained solely using local sensor data) and operate using an aggregate machine learning model (which is generated based on the federated learning and aggregation provided by the central server 182).

The audio-view 410 displays the local anomaly score 414 (y-axis) generated over time (x-axis), the aggregate anomaly score 412 (y-axis) generated over time (x-axis). In the example of FIG. 4, the triangular elements (e.g., 415) represent an anomaly alert. The anomaly alert represents when the anomaly score is over a threshold score 418 and, as such, likely to be associated with an anomaly event at the machine being monitored. In some implementations, the elements 415 are selectable to obtain additional information for the anomaly (e.g., anomaly type, time, machine location, and sensor data such as audio data, associated with the anomaly).

Figure 5A:
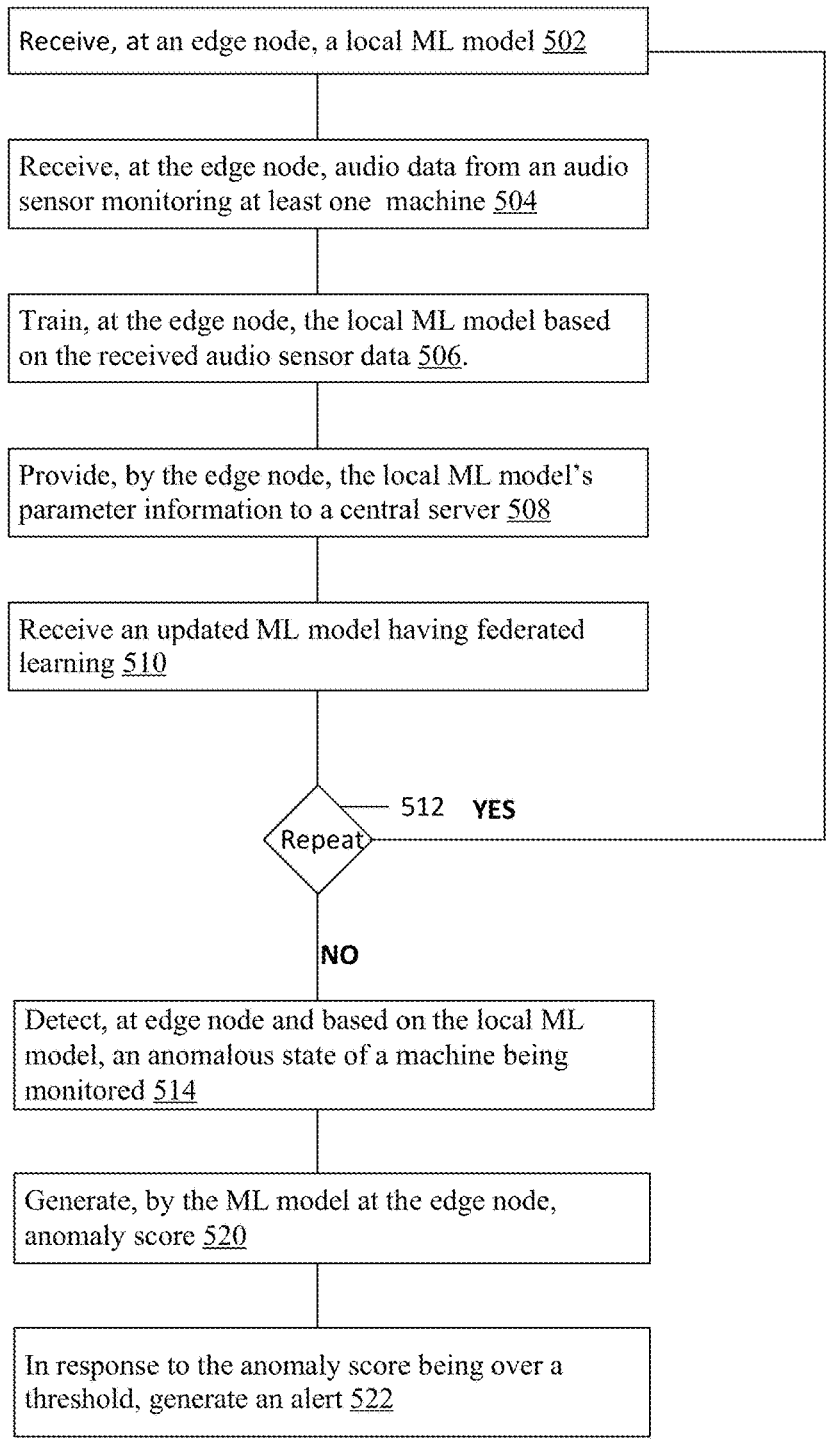
FIGS. 5A-5B illustrate examples of processes, in accordance with some implementations of the current subject matter.

FIG. 5A depicts an example of a process 500, in accordance with some example embodiments.

At 502, an edge node may receive a local ML model. For example, a computing device at a first location may receive from the central server a ML model to be used locally at the first location. For example, the central server 182 may provide to each of a plurality of edge nodes 112A-C a copy of a master ML model 186, which serves as a local ML models 106A-C at each of the edge nodes. The local ML model may comprise a preconfigured default ML model (e.g., an ML model that has been at least partially trained); an initialized local ML model (e.g., an ML model which has not been trained so the ML model may have random or initialized settings as parameters); or updated or aggregate ML model (which is a copy of the master ML model).

At 504, the edge node may receive audio data from an audio sensor monitoring at least one machine. For example, the machine 102A may be monitored by a sensor 104A, such as an audio sensor (e.g., a microphone) in order to monitor the state of the machine and detect an anomalous state of the machine 102A, such that when an anomalous state occurs (e.g., a failure or an impeding failure) maintenance can be performed on the machine 102A. The audio sensor data may be pre-processed so that the location of the sound is determined. For example, an audio array may determine the source location of the sound such that only sound from machine 102A is processed for detection of anomalies (while other machines and noise can be filtered out). Alternatively, or additionally, the audio sensor data may be pre-processed to transform the audio data from the time domain to the frequency domain using, for example, a Fourier transform (e.g., a Fast Fourier Transform or other type of transform). Moreover, the audio data is data collected locally at the edge node, such as local to the factory 112A, and this audio data may not be shared with other end-users and/or the central server 182 during ML model training.

At 506, the edge node may train the local ML model based on the audio sensor data received at 504. For example, the sensor 102 may generate audio sensor data from a machine 102A being monitored over time. This audio sensor data may include time stamps and one or more labels indicating whether the audio sensor data at a given time stamp is anomalous or not anomalous. This audio sensor data (which may be pre-processed as noted above and/or filtered for the machine's location using the audio array) may be cycled through the ML model 106A (see, also, above description regarding FIG. 3) until the ML model learns to provide the correct output, such as an anomaly score or other type of output indicating a probability or a likelihood of an whether the input sensor data may correspond to an anomaly.

At 508, the edge node may provide the local ML model's parameter information to a central server, which is performing federated learning across a plurality of edge nodes. For example, a computing device at the factory 112A may provide the parameter information for the local ML model to the central server 182 to allow the central server to learn in a federated manner across a plurality of edge node ML models. The central server may, as noted, aggregate the parameter information to generate an updated ML model (also referred to as aggregate ML model). This updated ML model may be shared with the edge nodes.

At 510, the edge node may receive an updated ML model, wherein the updated ML model includes the aggregate learning provided by the central server. The updated ML model may then be used as the local ML model at the edge node, such as at a computing device at factory 112A.

In some embodiments, the process 502-510 repeats at 512 during a training phase of the local ML model (e.g., until the local ML model converges to provide detection of anomalies to within a threshold level of accuracy). In some embodiments, the edge node may use the local ML model in an operational phase to detect, at 514, anomalous states of the machine. For example, the local ML model may be used to generate an anomaly score (e.g., an indication of the likelihood 350B that the audio data indicates an anomalous state at the machine) and report that score to other computing devices as heartbeat messages, alerts, and the like.

At 520, the local ML model may generate anomaly scores as sensor data, such as the audio data generated by sensor 104A. In response to the anomaly score being over a threshold, an alert may be generated, which can be sent to other computing devices such as central server 182, presented on a user interface, etc. The threshold may be predetermined, configured by an edge node, configured by the central server, configured by an end-user, and/or learned by the ML model.

At the process 500, the audio data used in the training phase 502-510 may be the same or different than the audio data used during the operational phase 514-522. During a training phase, the audio data may be training audio data that includes labels indicating anomalies (e.g., a first audio sample may have a label indicating an anomaly at the machine and a second audio sample may indicate the state is not anomalous) to enable machine learning model training. During the operation phase, the machine learning model is trained, so the audio data provided to the machine learning model may not be labeled (since it is the task of the trained ML model to detect the anomaly). However, the operational phase audio data may be used for training of the machine learning model as well. For example, if the machine learning model indicate an anomaly and the anomaly turns out to be true or confirmed, the operation phase audio data may be used by the edge node to subsequently train the machine learning model.

Figure 5B:
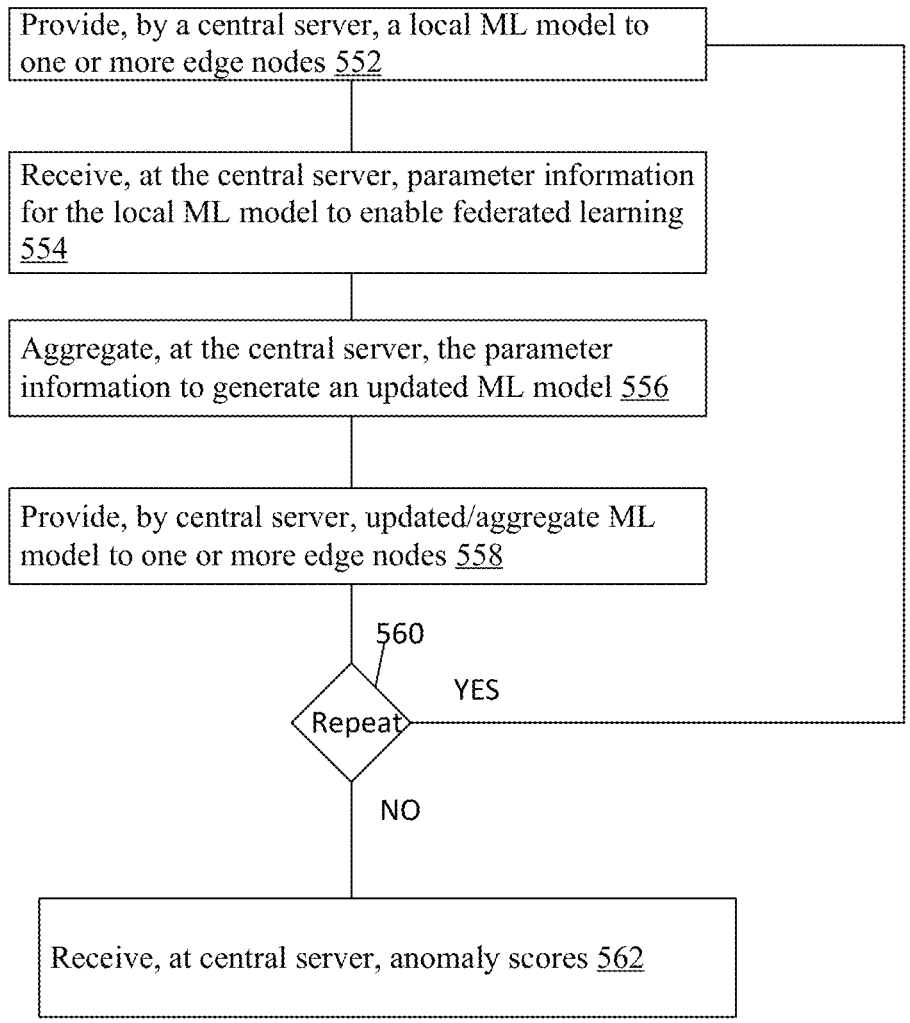

FIG. 5B depicts an example of a process 599, in accordance with some example embodiments.

At 552, the central server may provide a local ML model to one or more edge nodes. For example, the central server 182 may provide to each of the one or more edge nodes 112A-C a local ML model. Referring to FIG. 1A, the central server may provide a copy of the master ML model (which may be an initial version of the ML model, a predefined version of the ML model, or an updated/aggregate ML model).

At 554, the central server may receive parameter information for the local ML model to enable federated learning. For example, the central server 182 may receive at 124 (FIG. 1B, for example) parameter information, such as weights, from the edge nodes 112A and 112B.

At 556, central server may aggregate the parameter information to generate an updated ML model (also referred to as aggregate ML model). The central server may aggregate the parameter information from the edge nodes by combining or averaging the parameter information. For example, the weight information provided at 124 may be averaged.

At 558, the central server may provide the updated/aggregate ML model to one or more edge nodes. For example, the update or aggregated ML model (which is generated based on the combined or averaged parameter information) may be provided a 126 to the edge nodes, where the update or aggregated ML model can be used as the local ML model.

In some embodiments, the process 552-558 repeats (at 560) during a training phase of the local ML models. In some embodiments, an edge node may use the local ML model (or the aggregate local ML model) in an operational phase to detect and provide, at 562, anomaly scores to the central server. The anomaly scores may be included in heartbeat messages as noted above at 120 or conveyed to the central server in other formats as well. If the anomaly score is over a threshold, an alert can be generated. Referring to the example of FIG. 4, when an anomaly score is over a threshold 418, this may generate an alert, which may be presented on the user interface at 402 or presented or conveyed to the end-user in other ways as well.

Figure 6:
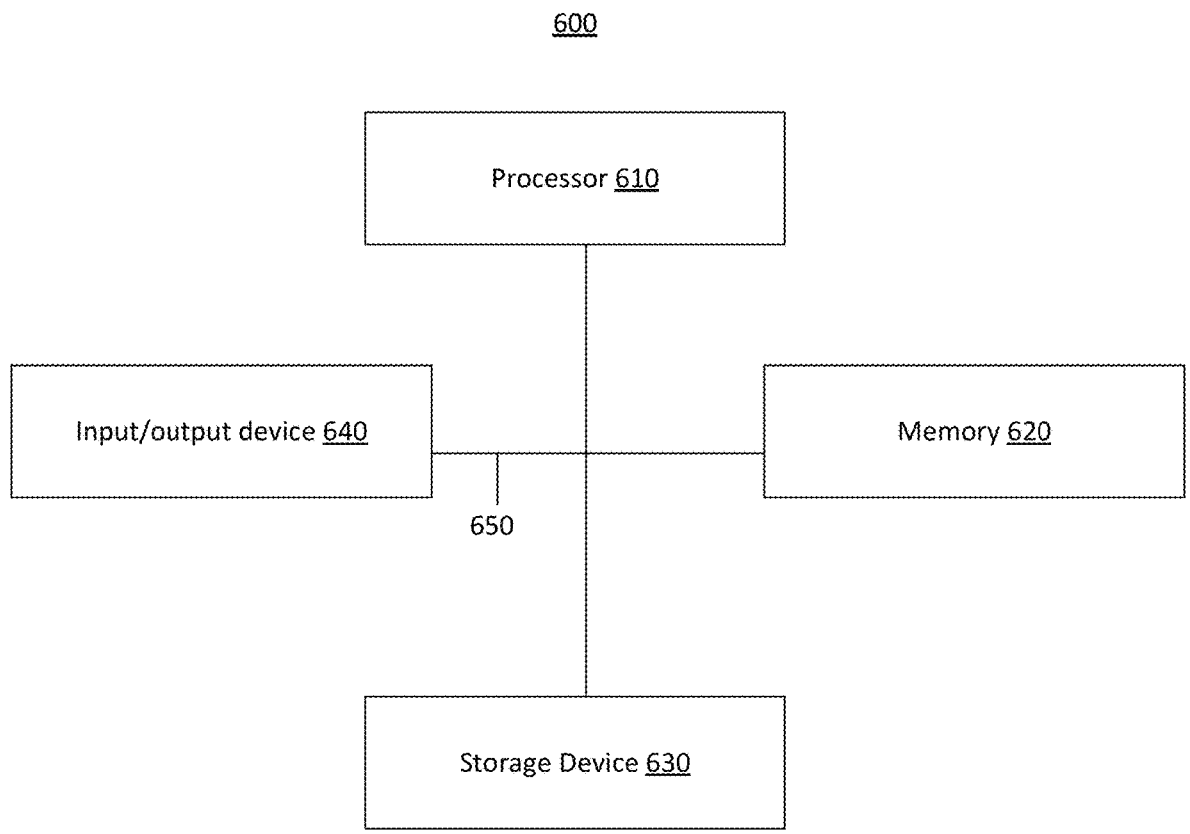
FIG. 6 is another example of a system, in accordance with some implementations of the current subject matter.

In some implementations, the current subject matter can be configured to be implemented in a system 600, as shown in FIG. 6. For example, any of the components described or depicted herein including FIGS. 1A, 1B, and FIG. 3 may be comprised in system 600. To illustrate further, the factory sever, training node, sensor, anomaly scorer, model manager, aggregator, dashboard services, model services, and the like may implemented using a physical system such as the system 600. The system 600 can include a processor 610, a memory 620, a storage device 630, and an input/output device 640. Each of the components 610-640 can be interconnected using a system bus 650. The processor 610 can be configured to process instructions for execution within the system 600. In some implementations, the processor 610 can be a single-threaded processor. In alternate implementations, the processor 610 can be a multi-threaded processor or a graphics processor unit (GPU). The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 520 can be a non-volatile memory unit. The storage device 630 can be capable of providing mass storage for the system 500. In some implementations, the storage device 630 can be a computer-readable medium. In alternate implementations, the storage device 630 can be a floppy disk device, a hard disk device, an optical disk device, a tape device, non-volatile solid-state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:
receiving, at a first edge node, a machine learning model provided by a central server configured to provide federated learning among a plurality of edge nodes including the first edge node;
receiving, at the first edge node, first audio data obtained from at least one audio sensor monitoring at least one machine located at the first edge node, wherein the first audio data is pre-processed by at least filtering, based on time of arrival, the first audio data to remove, at least partially, other audio data associated with other machines;
training, at the first edge node, the machine learning model, the training based on the first audio data;
in response to the training, providing, by the first edge node, parameter information to the central server in order to enable the federated learning among the plurality of edge nodes including the first edge node;
in response to the federated learning, receiving, by the first edge node, an aggregate machine learning model provided by the central server;
detecting, by the first edge node including the aggregate machine learning model, an anomalous state of the at least one machine, the anomalous state detected based on a second audio data received from the at least one audio sensor; and
reporting, by the first edge node, the anomalous state to the central server.

2. The method of claim 1, wherein the parameter information includes configuration information about the machine learning model trained by the first edge node, and wherein the configuration information includes one or more weights for the trained machine learning model.

3. The method of claim 1, wherein the first audio data is pre-processed by at least transforming the first audio data into a frequency domain.

4. The method of claim 1, wherein the machine learning model includes at least one of a convolutional neural network or a generative adversarial network.

5. The method of claim 1, wherein the aggregate machine learning model includes an average of the parameter information provided by the first edge node and of other parameter information provided by other edge nodes of the plurality of edge nodes.

6. The method of claim 5, wherein the aggregate machine learning model is generated without the central server accessing the first audio data at the first edge node or other audio data at the other edge nodes.

7. The method of claim 1, wherein the training further comprises providing, as an input to the machine learning model, the first audio data including time stamp information and label information indicative of whether an anomaly is present.

8. The method of claim 7, wherein the first audio data corresponds to training data to train the machine learning model, and wherein the second audio data represents operational data without label information indicative of whether the anomaly is present.

9. A system comprising:
  at least one processor; and
  at least one memory including program code which when executed by the at least one processor causes operations comprising:
    receiving, at a first edge node, a machine learning model provided by a central server configured to provide federated learning among a plurality of edge nodes including the first edge node;
    receiving, at the first edge node, first audio data obtained from at least one audio sensor monitoring at least one machine located at the first edge node, wherein the first audio data is pre-processed by at least filtering, based on time of arrival, the first audio data to remove, at least partially, other audio data associated with other machines;
    training, at the first edge node, the machine learning model, the training based on the first audio data;
    in response to the training, providing, by the first edge node, parameter information to the central server in order to enable the federated learning among the plurality of edge nodes including the first edge node;
    in response to the federated learning, receiving, by the first edge node, an aggregate machine learning model provided by the central server;
    detecting, by the first edge node including the aggregate machine learning model, an anomalous state of the at least one machine, the anomalous state detected based on a second audio data received from the at least one audio sensor; and
    reporting, by the first edge node, the anomalous state to the central server.

10. The system of claim 9, wherein the parameter information includes configuration information about the machine learning model trained by the first edge node, and wherein the configuration information includes one or more weights for the trained machine learning model.

11. The system of claim 9, wherein the first audio data is pre-processed by at least transforming the first audio data into a frequency domain.

12. The system of claim 9, wherein the machine learning model includes at least one of a convolutional neural network or a generative adversarial network.

13. The system of claim 9, wherein the aggregate machine learning model includes an average of the parameter information provided by the first edge node and of other parameter information provided by other edge nodes of the plurality of edge nodes.

14. The system of claim 13, wherein the aggregate machine learning model is generated without the central server accessing the first audio data at the first edge node or other audio data at the other edge nodes.

15. The system of claim 9, wherein the training further comprises providing, as an input to the machine learning model, the first audio data including time stamp information and label information indicative of whether an anomaly is present.

16. The system of claim 15, wherein the first audio data corresponds to training data to train the machine learning model, and wherein the second audio data represents operational data without label information indicative of whether the anomaly is present.

17. A non-transitory computer-readable storage medium including program code which when executed by at least one processor causes operations comprising:
  receiving, at a first edge node, a machine learning model provided by a central server configured to provide federated learning among a plurality of edge nodes including the first edge node;
  receiving, at the first edge node, first audio data obtained from at least one audio sensor monitoring at least one machine located at the first edge node, wherein the first audio data is pre-processed by at least filtering, based on time of arrival, the first audio data to remove, at least partially, other audio data associated with other machines;
  training, at the first edge node, the machine learning model, the training based on the first audio data;
  in response to the training, providing, by the first edge node, parameter information to the central server in order to enable the federated learning among the plurality of edge nodes including the first edge node;
  in response to the federated learning, receiving, by the first edge node, an aggregate machine learning model provided by the central server;
  detecting, by the first edge node including the aggregate machine learning model, an anomalous state of the at least one machine, the anomalous state detected based on a second audio data received from the at least one audio sensor; and
  reporting, by the first edge node, the anomalous state to the central server.

18. The non-transitory computer-readable storage medium of claim 17, wherein the parameter information includes configuration information about the machine learning model trained by the first edge node, and wherein the configuration information includes one or more weights for the trained machine learning model.

* * * * *